(12) United States Patent
Goodson et al.

(10) Patent No.: US 7,799,421 B2
(45) Date of Patent: Sep. 21, 2010

(54) CONTROLLED RELEASE MATERIALS

(75) Inventors: Susanne H. Goodson, Warrington, PA (US); Klein A. Rodrigues, Signal Mountain, TN (US)

(73) Assignee: Akzo Nobel N.V., Arnhem (NL)

( * ) Notice: Subject to any disclaimer, the term of this patent is extended or adjusted under 35 U.S.C. 154(b) by 273 days.

(21) Appl. No.: 10/074,522

(22) Filed: Feb. 14, 2002

(65) Prior Publication Data
US 2003/0158072 A1 Aug. 21, 2003

(51) Int. Cl.
*B32B 17/10* (2006.01)
*A01K 1/015* (2006.01)
*A61Q 5/08* (2006.01)

(52) U.S. Cl. .................. 428/334; 428/221; 428/339; 424/62

(58) Field of Classification Search .............. 424/62, 424/78.08
See application file for complete search history.

(56) References Cited

U.S. PATENT DOCUMENTS

| 3,886,125 | A | * | 5/1975 | Chromecek | 526/240 |
| 418,175 | A | | 11/1983 | Probst et al. | 524/555 |
| 4,708,870 | A | * | 11/1987 | Pardini | |

FOREIGN PATENT DOCUMENTS

| JP | 60 141705 | | 7/1985 |
| WO | WO 00/06684 | * | 2/2000 |
| WO | WO 00/17311 | | 3/2000 |
| WO | WO 00/56849 | | 9/2000 |
| WO | WO 02/04588 A1 | | 1/2002 |

OTHER PUBLICATIONS

Maechling-Strasser, C., et. al. "Preadsorption of Polymers on Glass and Silica to Reduce Fibrinogen adsorption", J. Biomedical Materials Research, vol. 23, 1385-1393 (1989).
U.S. Appl. No. 09/920,498, filed Aug. 1, 2001, Rodrigues, et al.

* cited by examiner

*Primary Examiner*—Humera N Sheikh
(74) *Attorney, Agent, or Firm*—James C. Abruzzo

(57) ABSTRACT

The invention relates to polymers whose water solubility may be triggered by changes in pH, salt concentration, concentration of surfactant or a combination of both. The polymer is a copolymer or terpolymer containing from 2 to 60 mole percent of an amine functionality that has been neutralized with a fixed acid. Specifically films formed from these polymers will be insoluble at a higher pH, but will become soluble at a lower pH. The polymers are also insoluble at a higher salt concentration, but become soluble at a lower salt concentration. The polymers can be used to coat or encapsulate active ingredients, that are released based on changes in the environment, such as in the rinse cycle of a dishwasher or laundry washing machine.

8 Claims, No Drawings

CONTROLLED RELEASE MATERIALS

FIELD OF THE INVENTION

This invention relates to polymers whose water solubility may be triggered by changes in pH salt or surfactant concentration, or a combination of both. Specifically films formed from these polymers will be insoluble at a higher pH, but will become soluble at a lower pH. The polymers are also insoluble at a higher salt concentration, but become soluble at a lower salt concentration. The pH and salt concentration where the solubility changes, can be adjusted by controlling the types and amounts of monomers in the polymer. The polymer is a copolymer or terpolymer containing from 2 to 60 mole percent of a protonated amine functionality which has been neutralized with a fixed acid.

BACKGROUND OF THE INVENTION

In many processes, different ingredients are most effective when introduced at specific points in the operation. For instance, rinse-aids or fragrances are more effective when released into the rinse cycle, rather than in the wash cycle, of a dishwashing or laundry process. One method to introduce an ingredient at a set time in the process would be to physically add it to the system when needed. Subsequent additions to a system are often not practical. Another method is to coat, encapsulate, or in some way protect the ingredient during the initial phases of an operation, then have the ingredient released at a given point due to a change in the environment triggering the removal of the protective barrier. These controlled release technologies allow all ingredients to be added to a system at one time, but released when triggered at different points in the operation. The trigger could be a change in the pH, salt concentration, or other environmental change.

WO 00/06684 describes a dishwasher detergent tablet, containing an encapsulated ingredient, where the coating has a solubility that increases with a declining concentration of a specific ion in the surrounding medium. Preferably the coating is an amine-containing polymer.

WO 00/17311 describes encapsulated detergent particles having a delayed release. The material coated is coated with a material that is insoluble in a wash solution having a pH of 10 or greater, yet soluble in a wash solution of pH 9 or less. As the wash cycle progresses, the wash pH decreases, protonating the coating material, making it more positively charged, and thus more water soluble. The increased water solubility allows the coating material to break down, releasing materials that had been encapsulated. The preferred encapsulating materials are amines, including polymeric amines.

U.S. Pat. No. 7,063,895 describes hydrophobically modified polymers of methyl methacrylate and dimethylaminopropyl methacrylate neutralized with acetic acid. The copolymer is exemplified for use as a controlled release agent.

The problem with these approaches to controlled release is that it is difficult to control the rate of dissolution of unneutralized amine materials in various pH ranges. Many amines are hydrophilic in nature even when unprotonated. This results in undesirable levels of dissolution of unneutralized amine materials even at higher pHs. Conversely, if the amine material is made more hydrophobic, it is difficult for water to penetrate films at neutral pH's. This results in a material that is not triggerable. Furthermore, these unneutralized amine materials will only be slightly protonated at both neutral and high pH in systems of low buffering capacity. This results in materials with either no solubility and trigger, or materials with an unacceptably slow, ill-defined trigger.

Surprisingly it has been found that a copolymer containing an amine functionality that is neutralized with a fixed base can form a triggerable protective layer on a material, releasing the material in a controlled manner at a given set of environmental pH and salt concentrations. The present invention has a very sharp and controllable trigger compared to the materials above which would not work in low buffering capacity systems such as detergent systems.

While not being bound by any particular theory, it is believed that after film formation, the copolymers of the present invention form a hydrophobic-hydrophilic material. The hydrophilic sections are the protonated amine monomer. The balance of the hydrophobic and hydrophilic character controls the triggering of the solubility. In alkaline water, the surface protonated amine groups on the film become deprotonated by the base present in the alkaline water. This reduces the surface solubility to the point where the polymer film cannot become swollen by the water and thus cannot dissolve. The hydrophobic comonomer aids in preventing swelling of the film. A significant amount of protonated amine groups remain in the interior of the film even in alkaline water. They are protected by the hydrophobic nature of the film and the fact that the surface protonated amine groups have become deprotonated (i.e., the film doesn't swell enough for the base in the water to penetrate the film and neutralize the interior protonated amine groups). Greater ionic strength also aids in not allowing swelling of the film. When the film is then placed in lower pH water, for example neutral water, there is less base present in the water and the film is much easier to swell due to some surface ionization at the lower pH. The water can then penetrate the film. The protonated amines in the interior of the film allow the polymer to then be dissolved in water.

Unneutralized amines with poor water solubility will not show a sharp trigger in systems of low buffering capacity. If these amines are neutralized with a volatile acid, no protonated amine will remain in the film after cure, resulting in films that are insoluble in all pH conditions. Conversely, if a water soluble amine is used, it will not show a trigger, since it will be soluble at every pH.

SUMMARY OF THE INVENTION

The present invention relates to a solid polymer film comprising a polymer comprising
a) 2 to 60 mole percent of protonated amine monomer units, wherein said protonation is formed by a fixed acid; and
b) 40 to 98 mole percent of hydrophobe monomer units.

The solid polymer film may be used to coat or encapsulate many types of materials. The polymer coating may be triggered to become soluble in aqueous media at a given set of environmental conditions including pH, ionic strength, surfactant concentration and temperature. When the polymer film is triggered and becomes soluble, the coated or encapsulated material is exposed to—or released into the environment.

DETAILED DESCRIPTION OF THE INVENTION

The present invention relates to a copolymer containing from 2 to 60 mole percent of protonated amine monomer units, and 40 to 98 mole percent of a hydrophobe. The amine monomers are protonated with a fixed acid. The polymer film can be used as a protective coating for a material, and can be removed by increasing the solubility of the copolymer through a change in the environment such as a change in pH, salt concentration, and other factors.

The protonated amine polymer is formed from one or more amine-functional monomers that are at least partially neutralized with a fixed acid. The amine monomer is an unsaturated monomer containing an aliphatic or aromatic amine group. The amine monomer includes mono-, di-, tri-, and multi-amines. Examples of such aliphatic amine-containing monomers include, but are not limited to, N,N-dialkylaminoalkyl (meth)acrylate, N,N-dialkylaminoalkylacrylate, N,N-dialkylaminoalkyl(meth)acrylamide and N,N dialkylaminoalkylacrylamide, where the alkyl groups are independently $C_{1-18}$. These include N-(3-dimethylaminopropyl)methacrylamide, N-(3-dimethylaminopropyl)acrylamide, N-(2-dimethylaminoethyl)methacrylate, N-(2-diethylaminoethyl)methacrylate, N-(2-dimethylaminoethyl)acrylate, N-(2-t-butylaminoethyl)methacrylate, and N-(3-morpholinopropyl)acrylamide, N-(2-diethylaminoethyl)methacrylate, N-(2-dimethylaminoethyl)acrylate, N-(3-dimethylaminoethyl)acrylate, Examples of useful aromatic amine monomers include vinyl pyridine, 1-vinylimidazole, 2-vinylpyridine, and 4-vinylpyridine. Furthermore, monomers such as vinyl formamide, vinyl acetamide, and the like which generate amine moieties on hydrolysis may also be used. Preferably the monomer is N-(2-dimethylaminoethyl) methacrylate, N-3-dimethylaminopropyl)methacrylamide, or a mixture thereof. Most preferably, the amino-functional monomer is N-(2-dimethylaminoethyl)methacrylate or N-(2-dimethylaminoethyl)acrylate.

The protonated amine-functional monomer(s) is present in the polymer at from 2 to 60 mole percent, preferably from 5 to 40 mole percent. Non-protonated amines may be present as hydrophobic comonomers, and may include the same amines that are unneutralized. The hydrophobic (non-protonated) amines may also include amine derivatives, such as quaternized amines, N-oxides and alkoxylated amines. The total amount of amine monomers, both protonated and un-protonated, that are present in the copolymer is from 5 to 100 mole percent, preferably 10 to 40 mole percent, and most preferably 10 to 20 mole percent.

The amine functional monomer(s) of the copolymer are at least partially neutralized with a fixed acid to form th e protonated amines. A fixed acid, as used herein, refers to an acid that is not removed from the polymer film during formation of the film or upon curing of the film. In this manner, the amine groups remain protonated. Examples of fixed acids include, but are not limited to hydrochloric acid, phosphoric acid, sulfuric acid, lactic acid and benzoic acid and mixtures thereof. Monofunctional acids are preferred, although small amounts of multifunctional acids can also be used in combination. A fixed acid is different than a volatile acid, such as acetic acid, which will be removed from the film during film formation or curing for 10 min at 130 C. When a volatile acid is removed, free amine groups are generated. The amine groups may be neutralized with a combination of volatile and non-volatile acids, provided at least 2 mole percent of the amine groups are neutralized with fixed acid.

The amine-functional monomer can be polymerized with one or more hydrophobic comonomers to form a copolymer or terpolymer. As used herein, a hydrophobic monomer is a monomer which forms a homopolymer of similar molecular weight to the copolymer of the invention, and which is insoluble in water. Insoluble in water, as used herein, means that less than 1 percent of the polymer dissolves in refluxing water after one hour. The monomer itself may be water-soluble as long as the polymerized form is insoluble in water. The comonomer can be the amino-functional monomer if the amino-functional monomer forms water insoluble polymers in the unneutralized state. Useful comonomers are hydrophobic monomers including, but not limited to, (meth)acrylates, maleates, (meth)acrylamides, vinyl esters, itaconates, styrenics, unsaturated hydrocarbons and acrylonitrile, nitrogen functional monomers, vinyl esters, alcohol functional monomers, unsaturated hydrocarbons, and $C_8$-$C_{22}$ alkoxylated (meth)acrylates. Preferred hydrophobic monomers are vinyl monomers and acrylate monomers such as methyl methacrylate, ethyl acrylate, and butyl acrylate.

Crosslinking monomers may also be present in the copolymer in small amounts. While a polymer without any crosslinking monomers is a preferred embodiment of the invention, another preferred embodiment is the addition of some crosslinking monomer. Some slight ionic crosslinking may decrease the swelling of the films under certain circumstances like higher temperatures, while not making the films completely insoluble.

Small amounts of hydrophilic monomer may also be used to form the copolymer, provided the hydrophobic portions of the polymer remain water insoluble.

The copolymer contains from 40 to 98 mole percent of the hydrophobic monomer, and preferably at least 60 mole percent.

The copolymer preferably has a weight average molecular weight of under 100,000, preferably from 10,000 to 50,000, and most preferably from 20,000 to 40,000. The aqueous polymer composition of the invention is a solution, as opposed to a latex or emulsion polymer.

The polymers of the present invention may be synthesized by solution polymerization of at least one acid-neutralizable amine-functional monomer in a non-aqueous solvent, to form a non-aqueous polymer solution. Optionally, the polymer may be a copolymer containing one or more hydrophobic monomers. The copolymer is synthesized by solution polymerization. As described in U.S. patent application Ser. No. 09/690,387, incorporated herein by reference. The process involves polymerizing at least one amine-functional monomer and at least one hydrophobic ethylenically unsaturated monomer in a non-aqueous solvent; forming an aqueous polymer dispersion from said non-aqueous polymer solution; and adding an fixed acid to at least partially neutralize the copolymer. The addition of the acid can occur either before, after, or during the formation of the aqueous polymer dispersion from the non-aqueous polymer solution.

The polymers formed from this type of process are generally random copolymers. However, other polymer architectures such as block, star etc may also be used. The special techniques used to synthesize these various types of polymer architecture are well known in the art.

The polymerization of the monomers in a non-aqueous solvent can be done by any means known in the art. The solvent should be miscible with water. Preferably the solvent is capable of forming an azeotrope with water. Examples of solvents useful in the present invention include, but are not limited to, alcohols such as methanol, ethanol, and isopropyl alcohol; glycol ethers; and acetone. If the solvent is a low boiling solvent, such as an alcohol or acetone, it may be stripped from the solution.

Formation of the aqueous polymer dispersion from the non-aqueous polymer solution can occur by several means. First is by the addition of water, or aqueous acid, to such an extent that the weight of water in the composition becomes greater that the weight of non-aqueous solvent. Second is by the addition of water or aqueous acid, plus a stripping off of the solvent or an azeotrope of the solvent. In whatever means the aqueous polymer solution is formed from the non-aqueous polymer solution, the result is a solution containing at least 50 percent water, based on the total weight of water and non-aqueous solvent. The final aqueous polymer composition is a dispersion.

The environmental conditions at which the copolymer will change from insoluble to soluble, or trigger, are dependent on the levels of protonated amino monomer, the level of hydrophobic comonomer, the Tg of the material, and the molecular weight of the material. These factors can be adjusted to provide a polymer film that can be triggered at the optimal environmental conditions for release of the coated or encapsulated material. In general, the polymer will become harder to swell at lower protonated amine levels, higher hydrophobic comonomer, higher Tg, and higher molecular weight. As the polymer becomes harder to swell, it will require less salt to remain insoluble. As the polymer film becomes harder to swell, the pH at which the polymer will trigger becomes lower. It is important to properly balance the properties to obtain a polymer that is triggerable. If the polymer has too much hydrophobic monomer, too little protonated amine monomer, or too high a molecular weight, the polymer will become insoluble even under lower pH conditions). Conversely, if the polymer has too little hydrophobic comonomer, too much protonated amine monomer, too low a Tg, or too low a molecular weight, the polymer film become hydrophilic and easy to swell, thereby only insoluble only at very high pH or very high salt.

The protonated amine polymers are useful in controlled release applications. Controlled release applications are ones in which the polymer of the invention is coated onto a material, or the material is encapsulated or physically trapped within the polymer. The solubility of the polymer is triggered at a certain set of environmental conditions. Once the coating solubility is triggered, it dissolved, and releases the material into the aqueous environment.

The polymer is insoluble in water at a certain pH, but is soluble at a lower pH. The pH at which the transition from insoluble to soluble occurs can be adjusted by modifying the types and amounts of monomers in the polymer, the molecular weight, and degree of neutralization, as described above. The polymers are also insoluble at high salt or surfactant concentrations, and become soluble at lower salt or surfactant concentrations. The combination of these effects appears to be more than cumulative and makes the trigger sharper and more defined.

The material that is coated or encapsulated may be an active ingredient, a mixture of active ingredients, or a solid material such as zeolite, porous microbeads, starch, or other such material onto which an active ingredient or ingredients has been absorbed.

Materials can be coated or encapsulated by any method known in the art, such as, but not limited to, spraying or brushing the polymer onto the material, immersing the material in the polymer dispersion, and fluidized bed application. The type of material coated, and the type of triggerable coating applied depends on the end-use application, and the point (environmental trigger or triggers) at which the material is to be released. The polymer coating is present on the coated/encapsulated material at a weight ratio of polymer to encapsulated material of from 5:95 to 95:5. The thickness of the dry polymer film depends on the end use. In some cases, a thin film will be sufficient, while in the case of a sachet which will be exposed to more abrasion, a much thicker film will be desired. Preferably the dry film has a thickness of 1-5 mil. The polymer composition used to coat/encapsulate a material may be formulated with co-additives or co-resins, provided the polymer's comonomer composition, Tg, and molecular weight is adjusted to account for any hydrophilicity or plasticization from the additive or resin added.

One specific application involves the encapsulation of laundry detergent and automatic dishwasher active ingredients, for protection during the wash cycle, but for delivery during the rinse cycle. The encapsulated active ingredients include, but are not limited to, one or more of the following: rinse aids, fragrances, anti-wrinkling aids, one or more surfactants, builders, ion exchangers, alkalis, anticorrosion materials, antiredeposition materials, optical brighteners, fragrances, dyes, chelating agents, enzymes, whiteners, brighteners, antistatic agents, sudsing control agents, solvents, hydrotropes, bleaching agents, perfumes, bleach precursors, water, buffering agents, soil removal agents, soil release agents, softening agents, opacifiers, inert diluents, buffering agents, corrosion inhibitors, graying inhibitors, and stabilizers. Since the wash water pH tends to be greater than pH 9, and the ionic strength tends to be greater than 0.001 to 0.01 percent by weight of salt and surfactant, the polymer films are insoluble, forming a protective barrier for the active ingredients. In the rinse cycle, where the pH is typically 6-8 and the salt and surfactant concentrations are lower by a factor of 50 to a 100, the polymer becomes soluble, releasing the encapsulated ingredients into the water.

The protonated amine polymers are useful in many other applications requiring a protective coating at higher pH and/or ionic strength, but the release of the encapsulated or coated material at lower pH and/or ionic strength. Such applications include, but are not limited to, those described and illustrated below. One of skill in the art will recognize many other applications for which these polymers are useful as triggerable protective coatings.

The polymer may be used as a coating for pills. The coating will not dissolve in the mouth, but will dissolve at the lower pH found in the stomach, releasing the active material. In a similar manner, cleaning actives could be encapsulated and released in a controlled manner in a toilet bowl. Nutrients and weed killers may be encapsulated for controlled release in agricultural applications. The copolymer could encapsulate an organic liquid, such as a fragrances, for release under a given set of conditions.

The protonated amine copolymer is useful for encapsulation of materials in a liquid detergent where the solid materials are suspended in the liquid detergent. The coating is insoluble due to the ionic strength, high surfactant concentration, and high pH of the liquid detergent. The coating could be designed to disintegrate either as the liquid detergent is diluted in the wash water or to disintegrate later in the rinse cycle by modifying the key characteristics of the polymer film. Shampoo, body wash and other personal care products could be formulated with actives encapsulated with the protonated amine polymers.

Sachets and microcapsules made of the copolymer film could contain a liquid detergent, and would remain insoluble to the detergent due to the high salt level and high pH. The sachet would then disintegrate when you put the microcapsule or sachet into the wash water. This could be for liquid tablets in dishwash or for laundry detergent. Microcapsules containing active ingredients could be formulated into liquid detergents for laundry or dishwash applications, as well as shampoo and bodywash applications. The encapsulated active ingredient(s) would be protected from reaction with other ingredients in the detergent, shampoo, or bodywash, yet when diluted in-use, the actives would be released. This could be useful, for example, in a shampoo/conditioner having an encapsulated conditioner, where the conditioner would not be released until the shampoo was diluted, thus allowing the conditioner to work on the hair after the shampoo.

The microcapsules of encapsulated actives, or actives adsorbed onto inert solids, could be made large enough to be visible, adding an attractive visual effect of suspended capsules in a personal case formulation.

The following non-limiting examples illustrate further aspects of the invention.

Example 1

To a 2-L flask equipped with a condenser, overhead paddle mixer and thermometer was added 282 g of isopropanol. The isopropanol was heated until a steady reflux was obtained. After 10 minutes under reflux conditions, a monomer mixture of 80 g of butyl acrylate (BA), 80 g of methyl methacrylate MMA), and 40 g of N-[(3-(dimethylamino)propyl]methacrylamide] (DMAPMA) was added to the flask from an addition funnel over 3 hours. Simultaneously, 1.5 g of 2,2'-azobis (methylbutyronitrile (Vazo 67) in 20 g of isopropanol was added over 3.5 hours. The materials were stirred at reflux using the paddle mixer during the two additions. At the end of 3.5 hours, the reaction mixture was held at reflux for 30 minutes and then half of the isopropanol was removed using a Dean-Stark trap. After half of the solvent was removed 18.27 g of HCl (38%) in 700 g of water was added with good agitation. After dissolution of the polymer, the remaining isopropanol was removed using the Dean-Stark trap. The solution was cooled to 30° C. and the polymer was obtained as a slightly hazy aqueous solution.

Examples 2-6

The examples below were carried out as in Example 1 using the monomer ratios and the acid neutralization levels listed in Table 1. DMAEMA is N-2-dimethylaminoethyl methacrylate.

Comparative Example 2

To a 2-L flask equipped with a condenser, overhead paddle mixer and thermometer was added 286 g of isopropanol. The isopropanol was heated until a steady reflux was obtained. After 10 minutes under reflux conditions, a monomer mixture of 80 g of butyl acrylate, 80 g of methyl methacrylate, and 40 g of N-[(3-(dimethylamino)propyl]methacrylamide was added to the flask from an addition funnel over 3 hours. Simultaneously, 2 g of 2,2'-azobis(methylbutyronitrile (Vazo 67) in 20 g of isopropanol was added over 3.5 hours. The materials were stirred at reflux using the paddle mixer during the two additions. At the end of 3.5 hours, the reaction mixture was held at reflux for 30 minutes and then half of the isopropanol was removed using a Dean-Stark trap. After half of the solvent was removed 14.1 g of acetic acid in 654 g of water was added with good agitation. After dissolution of the polymer, the remaining isopropanol was removed using the Dean-Stark trap. The solution was cooled to 30° C. and the polymer was obtained as a slightly hazy aqueous solution.

Comparative Example 3

To a 1-L flask equipped with a condenser, overhead paddle mixer and thermometer was added 110.0 g of isopropanol. The isopropanol was heated until a steady reflux was obtained. After 10 minutes under reflux conditions, 101.01 g of N-[(2-(dimethylamino)]methacrylate was added to the flask from an addition funnel over 3 hours. Simultaneously, 1.25 g of 2,2'-azobis(methylbutyronitrile (Vazo 67) in 40 g of isopropanol was added over 5 hours. The materials were stirred at reflux using the paddle mixer during the two additions. At the end of 5 hours, the reaction mixture was held at

TABLE 1

Summary of Examples 1-6

| Example | Mass BA | Mass MMA | Mass Amino Monomer | Mass Fixed Acid | % Fixed Neutralization | Mass Glacial Acetic Acid |
|---|---|---|---|---|---|---|
| 1 | 80 | 80 | 40 DMAPMA | 18.3 HCl | 80 | 0 |
| 2 | 85 | 85 | 30 DMAPMA | 13.7 HCl | 80 | 0 |
| 3 | 100 | 70 | 30 DMAPMA | 14.7 HCl | 85 | 0 |
| 4 | 120 | 50 | 30 DMAPMA | 14.7 HCl | 85 | 0 |
| 5 | 80 | 80 | 40 DMAEMA | 19.8 HCl | 80 | 0 |
| 6 | 80 | 80 | 40 DMAEMA | 14.9 HCl | 60 | 6.11 |

Comparative Example 1

To a 3-L flask equipped with a condenser, overhead paddle mixer and thermometer was added 1082 g of deionized water, 100 g of N-[(2-(dimethylamino)ethyl]methacrylate, 121.8 g of methanol, and 67.3 g of acetic acid. The material was sparged for 0.5 h, and then the mixture was heated to 40° C. Once the mixture reached this temperature, a solution of 0.25 g of ammonium persulfate in 9.4 g of water was charged to the reaction mixture. The mixture was stirred for 3 hours, and then a solution of 0.31 g of ammonium persulfate in 11.2 g of water was charged to the flask. The reaction mixture was held at 40° C. for an additional 3 hours and then cooled to room temperature and discharged.

reflux for 1 hour and then half of the isopropanol was removed using a Dean-Stark trap. After half of the solvent was removed 29.27 g of acetic acid in 50 g of water was added with good agitation. After dissolution of the polymer, the remaining isopropanol was removed using the Dean-Stark trap. An additional 200 g of water was added during the distillation. The solution was cooled to 30° C. and the polymer was obtained as yellow transparent solution.

Examples 7-15

Film solubility in detergent wash water and deionized water were tested. A film of each aqueous polymer solution in Table 1, and the three comparative Examples was made and allowed to dry at room temperature. The films were then cured at 130 C. for 5 minutes. Approximately 0.01-0.02 grams of film were then weighed using an aluminum pan. The films were then placed in 2 oz. jars. The jars were filled with 50 grams of a solution of 1.1 g of powdered Tide in 1 L of tap water (wash water). The jars were shook at room temperature using a mechanical shaker at a low setting for 5 minutes. The solutions were then filtered through Whatman Grade 226 filter paper and any film pieces were recovered. The film appearance was noted (see FIG. 1). At that point, the films were placed in the aluminum pans and dried for 15 minutes at 130 C. and re-weighed. In separate experiments, the film pieces were placed into 50 grams of deionized water after the Tide shaking procedure. The jars of deionized water were shook for 10 minutes. The solution was then filtered through a 200 mesh metal screen, and the screen was dried for 15 minutes at 130 C. The mass of remaining film was then determined. The results are summarized in Table 2. Alternatively, the films were placed in 400 grams of deionized water and allowed to sit with minimal agitation for 10 minutes (see FIG. 2).

TABLE 2

Detergent Solubility Tests.

| Example | Polymer Sample | Mole % Protonated Amine in Film | % Insoluble Detergent | % Insoluble DI Water |
|---|---|---|---|---|
| 7 | 1 | 11.34 | 99.0 | 5.3 |
| 8 | 2 | 8.35 | 88.8 | 30.8 |
| 9 | 3 | 9.05 | 92.6 | 0 |
| 10 | 4 | 9.29 | 93.0 | 0 |
| 11 | 5 | 12.13 | 90.8 | 0 |
| 12 | 6 | 9.10 | 90.7 | 0 |
| 13 | Comparative Example 1 | 0 | 100 | 100 |
| 14 | Comparative Example 2 | 0 | 100 | 100 |
| 15 | Comparative Example 3 | 0 | 0 | 0 |

What is claimed is:

1. A solid polymer film having water solubility triggered by change in pH, salt or surfactant concentration, or both, of an aqueous environment in which said solid polymer is immersed, said polymer comprising:

5 to 40 mole percent of protonated amine monomer units, wherein said protonation is formed by a fixed acid; and at least 60 mole percent of hydrophobic monomer units, wherein the polymer film has a thickness of 1 to 5 mil.

2. The polymer film of claim 1 wherein said hydrophobe monomer units comprise non-protonated amine monomer units.

3. The polymer film of claim 1 comprising from 5 to 100 mole percent of at least one amine monomer, including both protonated and non-protonated amines.

4. The polymer film of claim 3 comprising from 10 to 40 mole percent of at least one amine monomer, including both protonated and non-protonated amines.

5. The polymer film of claim 4 comprising from 10 to 20 mole percent of at least one amine monomer, including both protonated and non-protonated amines.

6. The polymer film of claim 1 wherein said fixed acid comprises at least one monofunctional acid.

7. The polymer film of claim 1 wherein said hydrophobic monomer comprises (meth)acrylates, maleates, (meth)acrylamides, vinyl esters, itaconates, styrenics, unsaturated hydrocarbons and acrylonitrile, nitrogen functional monomers, vinyl esters, alcohol functional monomers, unsaturated hydrocarbons, and $C_8$-$C_{22}$ alkoxylated (meth)acrylates.

8. The polymer film of claim 7 wherein said hydrophobic monomers comprise methyl methacrylate, ethyl acrylate, and butyl acrylate.

\* \* \* \* \*